(12) United States Patent
Lee et al.

(10) Patent No.: US 7,385,898 B2
(45) Date of Patent: Jun. 10, 2008

(54) APPARATUS AND METHOD FOR DETERMINING PRECISE PICKUP ACCESS TO DESIRED AREA OF OPTICAL DISC

(75) Inventors: Jong-hoon Lee, Gyeonggi-do (KR); Gwang-ho Lee, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 532 days.

(21) Appl. No.: 10/624,561

(22) Filed: Jul. 23, 2003

(65) Prior Publication Data

US 2004/0081430 A1    Apr. 29, 2004

(30) Foreign Application Priority Data

Sep. 25, 2002    (KR) ............... 10-2002-0058076

(51) Int. Cl.
*H04N 5/783* (2006.01)
(52) U.S. Cl. .................................. 369/53.29
(58) Field of Classification Search .............. None
See application file for complete search history.

(56) References Cited

U.S. PATENT DOCUMENTS

| | | | | |
|---|---|---|---|---|
| 5,844,865 | A * | 12/1998 | Bakx ................. | 369/53.29 |
| 6,058,086 | A | 5/2000 | Yeo et al. | |
| 6,466,535 | B2 * | 10/2002 | Park ................. | 369/112.01 |
| 6,741,534 | B1 * | 5/2004 | Takahashi et al. ........ | 369/47.14 |
| 7,012,861 | B1 * | 3/2006 | Hong et al. ............ | 369/44.28 |
| 2001/0009539 | A1 | 7/2001 | Ogasawara et al. | |
| 2002/0150394 | A1 | 10/2002 | Osakabe | |
| 2004/0001397 | A1 | 1/2004 | Jeong et al. | |
| 2004/0081430 | A1 | 4/2004 | Lee et al. | |

FOREIGN PATENT DOCUMENTS

| | | |
|---|---|---|
| KR | 1020010062678 | 7/2001 |
| KR | 2001-76445 | 8/2001 |
| KR | 1020010098589 | 11/2001 |

OTHER PUBLICATIONS

Korean Office Action corresponds to Korean Patent Application No. 10-2002-0058076.
U.S. Appl. No. 10/602,630, filed Jun. 25, 2003, Seung-hoon Kim, Samsung Electronics Co., Ltd.
Korean Patent Office Action for Korean Patent Application No. 10-202-0056226 dated Sep. 23, 2004, which corresponds to co-pending related U.S. Appl. No. 10/602,630, filed Jun. 25, 2003.

* cited by examiner

*Primary Examiner*—William Korzuch
*Assistant Examiner*—Joseph Haley
(74) *Attorney, Agent, or Firm*—Staas & Halsey LLP

(57) ABSTRACT

An apparatus and a method determine an area of an optical disc in which an inner area and an outer area of the optical disc having an absolute time of 99 minutes are distinguished from each other by referring to a number of ATIP syncs. The method includes counting the number of ATIP syncs for one rotation of the optical disc at a current position of a pickup when ATIP information recorded on the optical disc indicates that the pickup is currently present in an area of the optical disk that is greater than or equal to 95 minutes; and determining the current position of the pickup by comparing the number of counted ATIP syncs with a reference number of ATIP syncs. Accordingly, time spent determining the area of an optical disc and accessing the optical disc is reduced.

13 Claims, 4 Drawing Sheets

APPARATUS AND METHOD FOR DETERMINING PRECISE PICKUP ACCESS TO DESIRED AREA OF OPTICAL DISC

CROSS-REFERENCE TO RELATED APPLICATIONS

This application claims the priority of Korean Patent Application No. 2002-58076 filed Sep. 25, 2002, in the Korean Intellectual Property Office, the disclosure of which is incorporated herein in its entirety by reference.

BACKGROUND OF THE INVENTION

1. Field of the Invention

The present invention relates to an apparatus and a method for reproducing an optical recording medium, and more particularly, to an apparatus and method for determining an area of an optical disc, in which inner and outer regions of an optical disc with an absolute time of 99 minutes may be differentiated from each other by referring to a number of an absolute time-code in pre-groove (ATIP) syncs.

2. Description of the Related Art

In general, as shown in FIG. 1, an optical disc having an absolute time of 90 minutes consists of three signal areas: a lead-in area; a program area; and a lead-out area. The lead-in area contains information recorded on the optical disc, such as location information, the type of disc, and reproduction time. In the lead-in area, which is called a table of content (TOC) area, a TOC signal is repeatedly recorded. A reproduction signal is recorded in the program area, and the ending of a program is indicated in the lead-out area. Referring to FIG. 1, except for an optical disc having the absolute time of 99 minutes, a 90-99 minute area is present only in the lead-in area (shown as 95-99 minutes in the example in FIG. 1). For access to an optical disc, time information of a pickup is converted into a logical block address (LBA) to measure a distance of movement of the pickup. In this case, current time information of the pickup is converted into −LBA when the pickup is present in the lead-in area and converted into +LBA when the pickup is present in the area other than the lead-in area, i.e., the program area or the lead-out area.

FIG. 2 is a flowchart illustrating a conventional method of determining the area of an optical disc. Referring to FIG. 2, whether current time information of a pickup is 95 minutes or more is checked using ATIP information which is recorded on an optical disc, in operation 200. If the current time information of the pickup is 95 minutes or more, the pickup is regarded as being currently positioned in a lead-in area, and current time information of the pickup is converted into −LBA, in operation 201. However, if the current time information of the pickup is less than 95 minutes, the pickup is judged to be currently located in an area other than the lead-in area, and the position of the pickup is converted into +LBA, in operation 202.

However, in the case of an optical disc having an absolute time of 99 minutes, 90-99 minute areas are present in both a lead-in area and the area other than the lead-in area, i.e., a program area or a lead-out area, as shown in FIG. 3. Therefore, whether a pickup is present in the lead-in area or an area other than the lead-in area must be determined. Otherwise, when the pickup is present in a 95-99 minute area, a seek error may occur. The area of the optical disc where a pickup is located has to be determined to measure a distance of movement of the pickup precisely. Then, the position of the pickup is converted into −LBA when the pickup is judged to be present in the lead-in area and converted into +LBA when the pickup is judged to be present in an area other than the lead-in area. Accordingly, the distance of movement of the pickup may be precisely measured, thus rendering precise access to a desired point of the optical disc.

SUMMARY OF THE INVENTION

The present invention provides an apparatus to determine the area of an optical disc, through which an inner area and an outer area of an optical disc having an absolute time of 99 minutes may be differentiated from each other by referring to a number of an absolute time-code in pre-groove (ATIP) syncs.

The present invention also provides a method of determining the area of an optical disc, through which an inner area and an outer area of an optical disc having an absolute time of 99 minutes may be differentiated from each other by referring to the number of ATIP syncs.

According to an aspect of the present invention, an apparatus for determining the area of an optical disc comprises a pickup that reads or records a signal from or to the optical disc; a spindle motor that rotates the optical disc; and a controller that counts the number of ATIP syncs for one rotation of the optical disc at the current position of the pickup, compares the number of counted ATIP syncs with a reference number of ATIP syncs, and determines the current position of the pickup based on the comparison result when it is determined from ATIP information read by the pickup that the pickup is present in the area of 95 minutes or more of the optical disc.

An ATIP sync is output for a block of data that is a unit of measurement for data recording, wherein one block corresponds to 2 Kbytes.

The controller comprises a memory that stores the reference number of ATIP syncs for each track of the optical disc; a counter that counts the number of ATIP syncs for each track at the current position of the pickup; and a location determination unit that compares the number of counted ATIP syncs with the reference number of ATIP syncs and determines the current position of the pickup based on the comparison result.

The location determination unit determines that the pickup is present in a lead-in area when the number of counted ATIP syncs is less than the reference number of ATIP syncs.

The location determination unit determines that the pickup is present in an area other than the lead-in area when the number of counted ATIP syncs is more than the reference number of ATIP syncs.

According to another aspect of the present invention, a method of determining the area of an optical disc comprises counting the number of ATIP syncs for one rotation of the optical disc at the current position of the pickup when it is determined from ATIP information recorded on the optical disc that the pickup is currently present in the area of 95 minutes or more of the optical disc; and determining the current position of the pickup by comparing the number of counted ATIP syncs with a predetermined reference number of ATIP syncs.

An ATIP sync is output for a block of data which is a unit of measurement for data recording, wherein one block corresponds to 2 Kbytes.

During the determination of the current position of the pickup, the pickup is determined to be present in the lead-in area when the number of counted ATIP syncs is less than the reference number.

During the determination of the current position of the pickup, the pickup is determined to be present in an area other than the lead-in area when the number of counted ATIP syncs is more than the reference number.

Additional aspects and/or advantages of the invention will be set forth in part in the description which follows and, in part, will be obvious from the description, or may be learned by practice of the invention.

BRIEF DESCRIPTION OF THE DRAWINGS

These and/or other objects and advantages of the invention will become apparent and more readily appreciated from the following description of the preferred embodiments, taken in conjunction with the accompanying drawings of which.

DETAILED DESCRIPTION OF THE EMBODIMENTS

Figure 1:
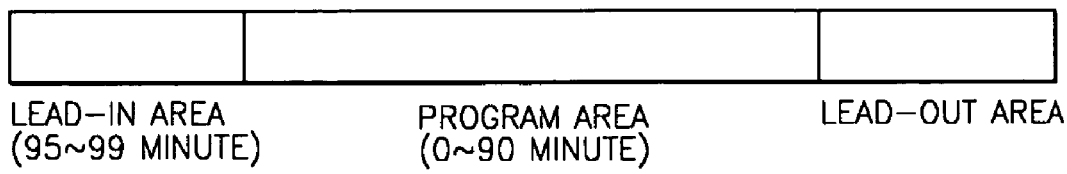
FIG. 1 is a diagram of signal areas illustrating an optical disc having an absolute time of 90 minutes.
Figure 2:
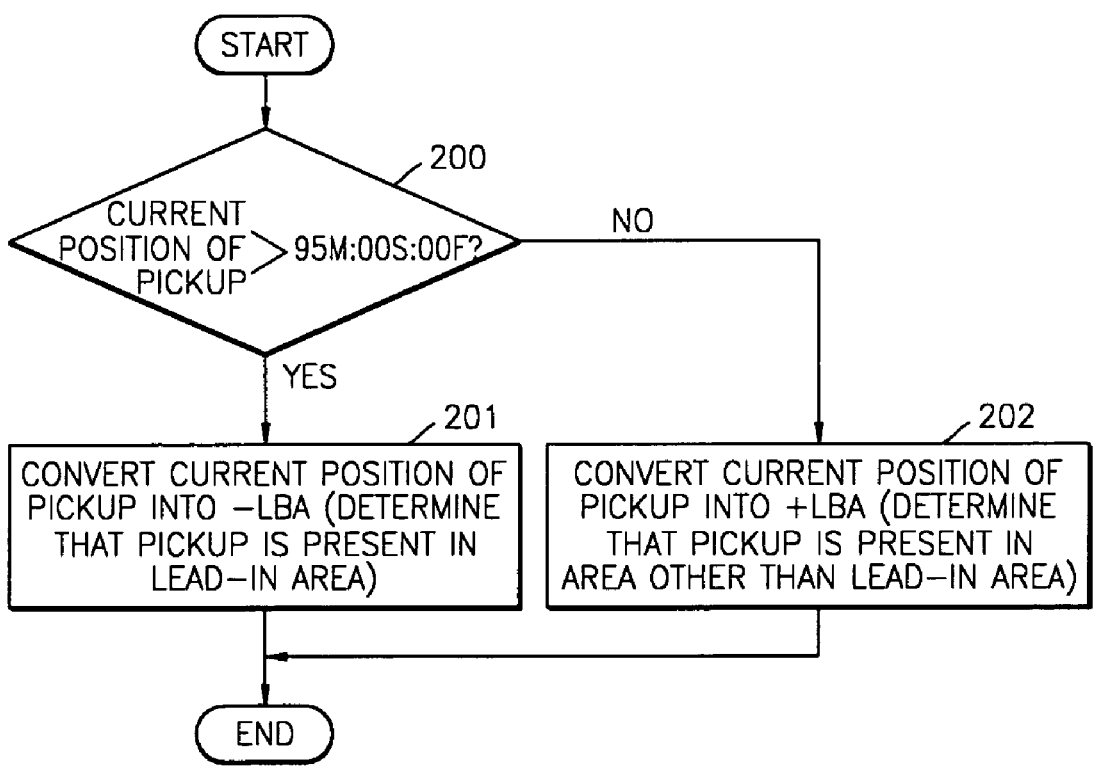
FIG. 2 is a flowchart illustrating a conventional method of determining an area of an optical disc.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
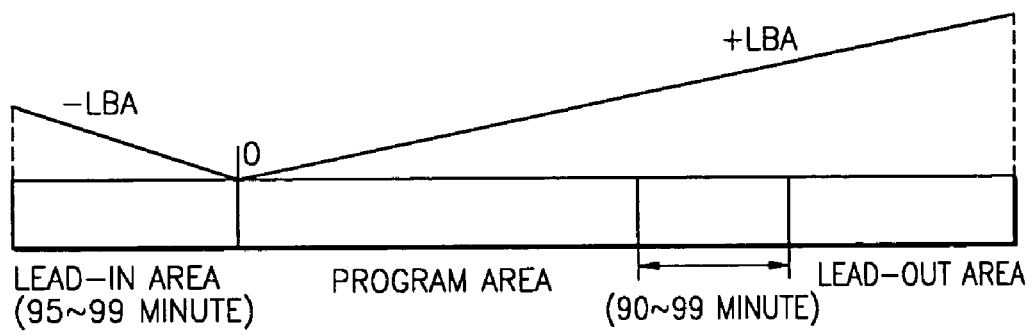
FIG. 3 is a diagram illustrating signal areas of an optical disc having the absolute time of 99 minutes in accordance with an embodiment of the present invention.
Figure 4:
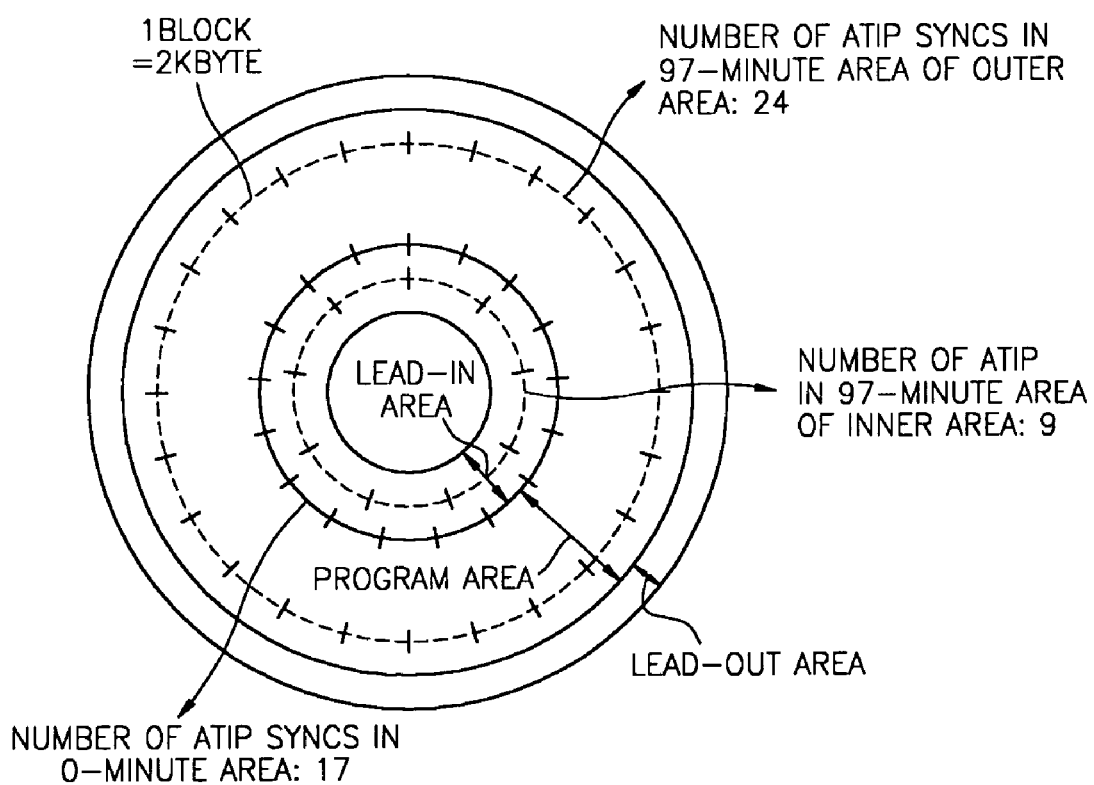
FIG. 4 is a diagram illustrating an example of a number of an absolute time-code in pre-groove (ATIP) syncs which is used in determining the area of an optical disc in accordance with an embodiment of the present invention.

FIG. 3 is a diagram illustrating signal areas of an optical disc having an absolute time of 99 minutes. FIG. 4 is a diagram illustrating a number of an absolute time-code in pre-groove (ATIP) syncs, which is used in determining an area of an optical disc.

Figure 5:
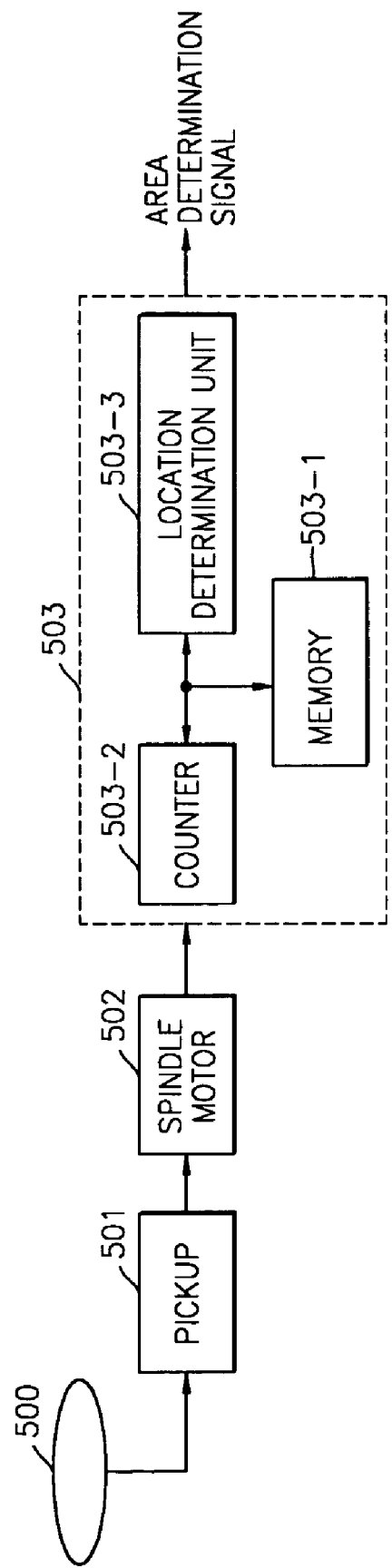
FIG. 5 is a block diagram illustrating the structure of an apparatus to determine the area of an optical disc, according to an embodiment of the present invention.

FIG. 5 is a block diagram illustrating the structure of an apparatus to determine the area of an optical disc 500 according to an embodiment of the present invention. Referring to FIG. 5, the apparatus includes a pickup 501, a spindle motor 502, and a controller 503. The controller 503 includes a memory 503-1, a counter 503-2, and a location determination unit 503-3.

Figure 6:
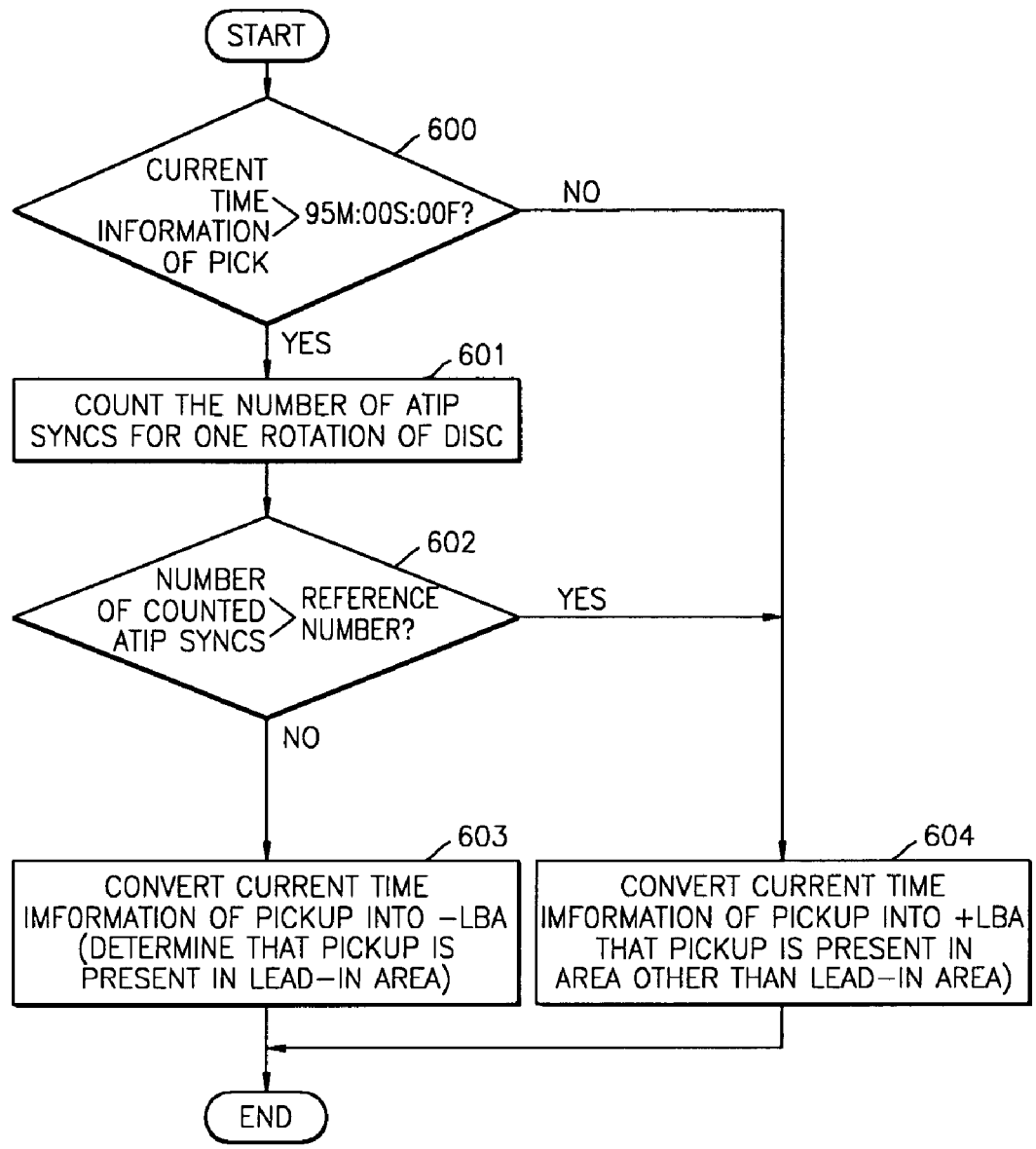
FIG. 6 is a flowchart illustrating a method of determining an area of an optical disc, according to an embodiment of the present invention.

FIG. 6 is a flowchart illustrating a method of determining an area of an optical disc, according to an embodiment of the present invention. Referring to FIG. 6, the method includes checking whether current time information of a pickup is 95 minutes or more (operation 600); counting the number of ATIP syncs per rotation of an optical disc (operation 601); checking whether the number of the counted ATIP syncs exceeds a predetermined number (operation 602); determining that the pickup is currently located in a lead-in area of the optical disc and converting current time information of the pickup into −LBA (logical block address) (operation 603); determining that the pickup is located in an area other than the lead-in area and converting current time information of the pickup into +LBA (operation 604).

Hereinafter, an apparatus and a method to determine the area of an optical disc, according to an embodiment of the present invention, will be described with reference to FIGS. 3 through 6.

In general, when the optical disc 500 is inserted into a recording apparatus, the recording apparatus reads ATIP information, which is recorded on tracks of the optical disc 500 at predetermined intervals using the pickup 501. The ATIP information contains information regarding the optical disc 500, such as a name of the manufacturing company, a maximum recording speed, an optimum power source, and a starting point of data.

When the optical disc 500 has an absolute time of 99 minutes, location information decoded in the ATIP is repeatedly included in a lead-in area and a program area as shown in FIG. 3, and therefore, it is difficult to detect the current position of the pickup 501 precisely using the location information. To solve this problem, according to the present invention, the number of ATIP syncs is counted to detect the current position of the pickup 501.

FIG. 4 illustrates the number of ATIP syncs for each track of the optical disc 500. In general, data is recorded on each track of the optical disc 500 in units of blocks, i.e., in a 2 Kbyte unit, and one ATIP sync is recorded for one block. As a track of the optical disc 500 reaches an outer area of the optical disc 500, the circumference of the track becomes larger. Likewise, as a track of the optical disc 500 reaches the outer area, a total number of ATIP syncs increases. Referring to FIG. 4, in a 97-minute region of an inner area, i.e., a lead-in area, the number of blocks is set to 9 and the number of ATIP syncs is also 9. In a 97-minute region of the outer area, i.e., a program area, the number of blocks is set to 24 and the number of ATIP syncs is also 24. A 0-minute region is used as a reference region in determining the area of the optical disc 500, i.e., the current position of the pickup 501. In the 0-minute region, the number of blocks is set to 17 and the number of ATIP syncs is 17. Accordingly, the current location of the pickup 501 is detected by comparing the number of ATIP syncs counted at the current location of the pickup 501 with a reference number of syncs.

An apparatus to determine the area of the optical disc 500 will now be described with reference to FIG. 5. The optical disc 500 has an absolute time of 99 minutes. The pickup 501 reads or records a signal from or to the optical disc 500. The spindle motor 502 revolves the optical disc 500.

When it is determined from the ATIP information read by the pickup 501 that the pickup 501 is present in a region of 95 minutes of more, the controller 503 counts the number of ATIP syncs for one rotation of the optical disc 500 at the current location of the pickup 501, compares the number of counted ATIP syncs with the reference number of syncs, and determines the current position of the pickup 501 based on the comparison result. As described above, the controller 503 includes the memory 503-1, the counter 503-2, and the location determination unit 503-3.

The memory 503-1 stores the reference number of ATIP syncs for each track of the optical disc 500. For instance, the reference number of ATIP syncs stored in the memory 503-1 may be 17 in the 0-minute region as shown in FIG. 4.

The counter 503-2 counts the number of ATIP syncs for one rotation of the optical disc 500 at the current location of the pickup 501. For instance, if the pickup 501 is present in the 97-minute region of the inner area shown in FIG. 4, the counter 503-2 counts 9 syncs for one rotation of the optical disc 500. If the pickup 501 is present in the 97-minute area of the outer area, the counter 503-2 counts 24 syncs for one rotation of the optical disc 500.

The location determination unit 503-3 compares the number of counted ATIP syncs with the reference number of ATIP syncs stored in the memory 503-1 and determines the current position of the pickup 501 based on the comparison result. When the number of counted ATIP syncs is less than the reference number of ATIP syncs, the location determination unit 503-3 regards the pickup 501 as being present in the lead-in area. For instance, if the reference number of ATIP syncs stored in the memory 503-1 is 17 and the number of ATIP syncs counted at the current position of the pickup 501 is smaller than 17, the location determination unit 503-3 determines that the pickup 501 is currently located in the lead-in area. When the number of counted ATIP syncs is more than the reference number of ATIP syncs, the location determination unit 503-3 regards the pickup 501 as being present in an area other than the lead-in area. In detail, if the reference number of ATIP syncs stored in the memory 503-1 is 17 and the number of ATIP syncs counted at the current position of the pickup 501 is larger than 17, the location determination unit 503-3 determines that the pickup 501 is currently located in an area other than the lead-in area.

A method of determining the area of the optical disc 500 will now be explained with reference to FIG. 6. First, the ATIP information is checked and is compared with current time information to determine whether the current time information of the pickup 501 is 95 minutes or more in operation 600.

When the current time information of the pickup 501 is 95 minutes or more, the number of ATIP syncs for one rotation of the optical disc 500 is counted in operation 601.

After operation 601, a number of counted ATIP syncs is checked to determine whether the number of counted ATIP syncs is more than a reference number of ATIP syncs in operation 602. The reference number of ATIP syncs for each track of the optical disc 500 is stored in the memory 503-1. In FIG. 4, the reference number of ATIP syncs stored in the memory 503-1 is set to 17 in the 0-minute region.

If the number of counted ATIP syncs is less than the reference number, the pickup is deemed to be present in the lead-in area, and current time information regarding the pickup 501 is calculated into −LBA in operation 603. For instance, the pickup 501 is deemed to be currently located in the lead-in area when the reference number of ATIP syncs stored in the memory 503-1 is 17 and the number of ATIP syncs counted at the current position of the pickup 501 is smaller than 17.

If the number of counted ATIP syncs is greater than the reference number (operation 602) or the current time information of the pickup 501 is less than 95 minutes (operation 600), the pickup is judged to be present in an area other than the lead-in area, and current time information regarding the pickup 501 is calculated into +LBA in operation 604. For instance, the pickup 501 is deemed currently located in an area other than the lead-in area when the reference number of ATIP syncs stored in the memory 503-1 is 17 and the number of ATIP syncs counted at the current position of the pickup 501 is larger than 17.

As described above, according to the present invention, an inner area and an outer area are distinguished for an optical disc having the absolute time of 99 minutes by referring to the number of ATIP syncs. Therefore, the time spent determining the area of the optical disc and accessing the optical disc is reduced.

The method of the present invention could be implemented on a computer-readable medium having computer-executable instructions. In an embodiment, a computer-readable medium has computer-executable instructions stored thereon to determine a position of a pickup of an optical disc, wherein the computer-executable instructions include: storing a reference number of an absolute time-code in pre-groove (ATIP) synes for each track of the optical disc; counting a number of ATIP syncs for one rotation of the optical disk at a current location of a pickup to provide a counted number of ATIP syncs; comparing the counted number of ATIP syncs with the reference number of ATIP synes stored in the memory for each track to determine a comparison result; and determining a current position of the pickup based on the comparison result. Where selected, an ATIP sync is output for a block of data which is a unit of measurement for data recording, and wherein one block corresponds to 2 Kbytes. Where desired, during determining of the current position of the pickup, the pickup is determined to be present in a lead-in area when the counted number of ATIP syncs is less than the reference number of ATIP synes. Where selected, during determining of the current position of the pickup, the pickup is determined to be present in an area other than a lead-in area when the counted number of ATIP syncs is greater than the reference number of ATIP syncs.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus to determine an area of an optical disc efficiently, comprising:
   a pickup that reads/records a signal from/to the optical disc;
   a spindle motor that revolves the optical disc; and
   a controller that determines whether current time information of the pickup is greater than or equal to 95 minutes,
      where current time information is less than or equal to 95 minutes, determines a logical block address of the pickup, and
      where current time information is greater than 95 minutes,
         counts a number of absolute time-code in pre-groove (ATIP) syncs for one rotation of the optical disc at a current position of the pickup,
         compares the number of counted ATIP syncs with a reference number of ATIP syncs, and
            where the number of ATIP syncs is less than or equal to the reference number of ATIP syncs, determines that the pickup is in a lead-in area, and
            where the number of ATIP syncs is greater than the reference number of ATIP syncs, determines the logical block address of the pickup,
   wherein the optical disc has an absolute time of 99 minutes, and
   wherein the controller comprises:
      a memory that stores a reference number of ATIP syncs for each track of the optical disc;

a counter that counts the number of ATIP syncs for each track at the current position of the pickup; and a location determination unit that compares the number of counted ATIP syncs with the reference number of ATIP syncs and determines the logical block address of the pickup to reduce access time.

2. The apparatus of claim 1, wherein an ATIP sync is output for a block of data that is a unit of measurement for data recording, and wherein one block corresponds to 2 Kbytes.

3. The apparatus of claim 1, wherein the location determination unit determines that the pickup is present in an area other than a lead-in area when the number of counted ATIP syncs is greater than the reference number of ATIP syncs.

4. A method of determining an area of an optical disc efficiently, comprising:

determining whether current time information of the pickup is greater than or equal to 95 minutes, and where the current time information is less than or equal to 95 minutes, determining a logical block address of the pickup and where the current time information is greater than 95 minutes, counting a number of absolute time-code in pre-groove (ATIP) syncs for one rotation of the optical disc at a current position of a pickup;

storing, in a memory, the reference number of ATIP syncs for each track of the optical disc, counting, by a counter, the number of ATIP syncs for each track at the current position of the pickup, and comparing, by a location determination unit, the number of counted ATIP syncs with the reference number of ATIP syncs and where the number of ATIP syncs is less than or equal to the reference number, determining that the pickup is in a lead-in area, and where the number of ATIP syncs is greater than the reference number, determining the logical block address of the pickup to reduce access time.

5. The method of claim 4, wherein an ATIP sync is output for a block of data which is a unit of measurement for data recording, and wherein one block corresponds to 2 Kbytes.

6. The method of claim 4, wherein during the determining of the current position of the pickup, the pickup is determined to be present in an area other than a lead-in area when the number of counted ATIP syncs is greater than the reference number of ATIP syncs.

7. A controller to determine a logical block address of a pickup of an optical disc, comprising:

a memory that stores a reference number of an absolute time-code in pre-groove (ATIP) syncs for each track of the optical disc;

a counter, coupled to the memory, that determines whether current time information of the pickup is greater than or equal to 95 minutes, and where the current time information is less than or equal to 95 minutes, determines a logical block address of the pickup and where the current time information is greater than 95 minutes, counts a number of ATIP syncs for one rotation of the optical disk at a current location of the pickup to provide a counted number of ATIP syncs; and a location determination unit, coupled to the counter and the memory, that compares the counted number of ATIP syncs with the reference number of ATIP syncs stored in the memory for each track and where the number of ATIP syncs is less than or equal to the reference number, determines that the pickup is in a lead-in area, and where the number of ATIP syncs is greater than the reference number, determines the logical block address of the pickup to reduce access time.

8. The controller of claim 7, wherein an ATIP sync is output for a block of data which is a unit of measurement for data recording, and wherein one block corresponds to 2 Kbytes.

9. The controller of claim 7, wherein during determining of the current position of the pickup, the pickup is determined to be present in an area other than a lead-in area when the counted number of ATIP syncs is greater than the reference number of ATIP.

10. A computer-readable medium having computer-executable instructions stored thereon to determine a logical block address of a pickup of an optical disc efficiently, wherein the computer-executable instructions include:

determining whether current time information of the pickup is greater than or equal to 95 minutes;

where current time information is less than or equal to 95 minutes, determining a logical block address of the pickup; and where current time information is greater than 95 minutes;

storing a reference number of an absolute time-code in pre-groove (ATIP) syncs for each track of the optical disc;

counting a number of ATIP syncs for one rotation of the optical disk at a current location of a pickup to provide a counted number of ATIP syncs;

comparing the counted number of ATIP syncs with the reference number of ATIP syncs stored in the memory for each track and where the number of ATIP syncs is less than or equal to the reference number, determining that the pickup is in a lead-in area, and where the number of ATIP syncs is greater than the reference number, determining the logical block address of the pickup to reduce access time.

11. The computer-readable medium of claim 10, wherein an ATIP sync is output for a block of data which is a unit of measurement for data recording, and wherein one block corresponds to 2 Kbytes.

12. The computer-readable medium of claim 10, wherein during determining of the current position of the pickup, the pickup is determined to be present in an area other than a lead-in area when the counted number of ATIP syncs is greater than the reference number of ATIP syncs.

13. An apparatus to determine an area of an optical disc efficiently, comprising:

a pickup that reads/records a signal from/to the optical disc; and a controller that determines whether current time information of the pickup is greater than or equal to 95 minutes, and where the current time information is less than or equal to 95 minutes, determines a logical block address of the pickup and where the current time information is greater than 95 minutes, counts a number of absolute time-code in pre-groove (ATIP) syncs for one rotation of the optical disc at a current position of the pickup, compares the number of counted ATIP syncs with a reference number of ATIP syncs, and where the number of ATIP syncs is less than or equal to the reference number, determines that the pickup is in a lead-in area, and where the number of ATIP syncs is greater than the reference number, determines the logical block address of the pickup to reduce access time, wherein the optical disc has an absolute time of 99 minutes, and wherein the controller comprises:
   a memory that stores a reference number of ATIP syncs for each track of the optical disc;
   a counter that counts the number of ATIP syncs for each track at the current position of the pickup; and
   a location determination unit that compares the number of counted ATIP syncs with the reference number of ATIP syncs and determines the logical block address of the pickup.

* * * * *